Oct. 12, 1965  B. W. KING  3,210,999
PORTABLE INSTRUMENT FOR MEASURING AN ELEVATION ABOVE WATER LEVEL
Filed Feb. 6, 1964  3 Sheets-Sheet 3

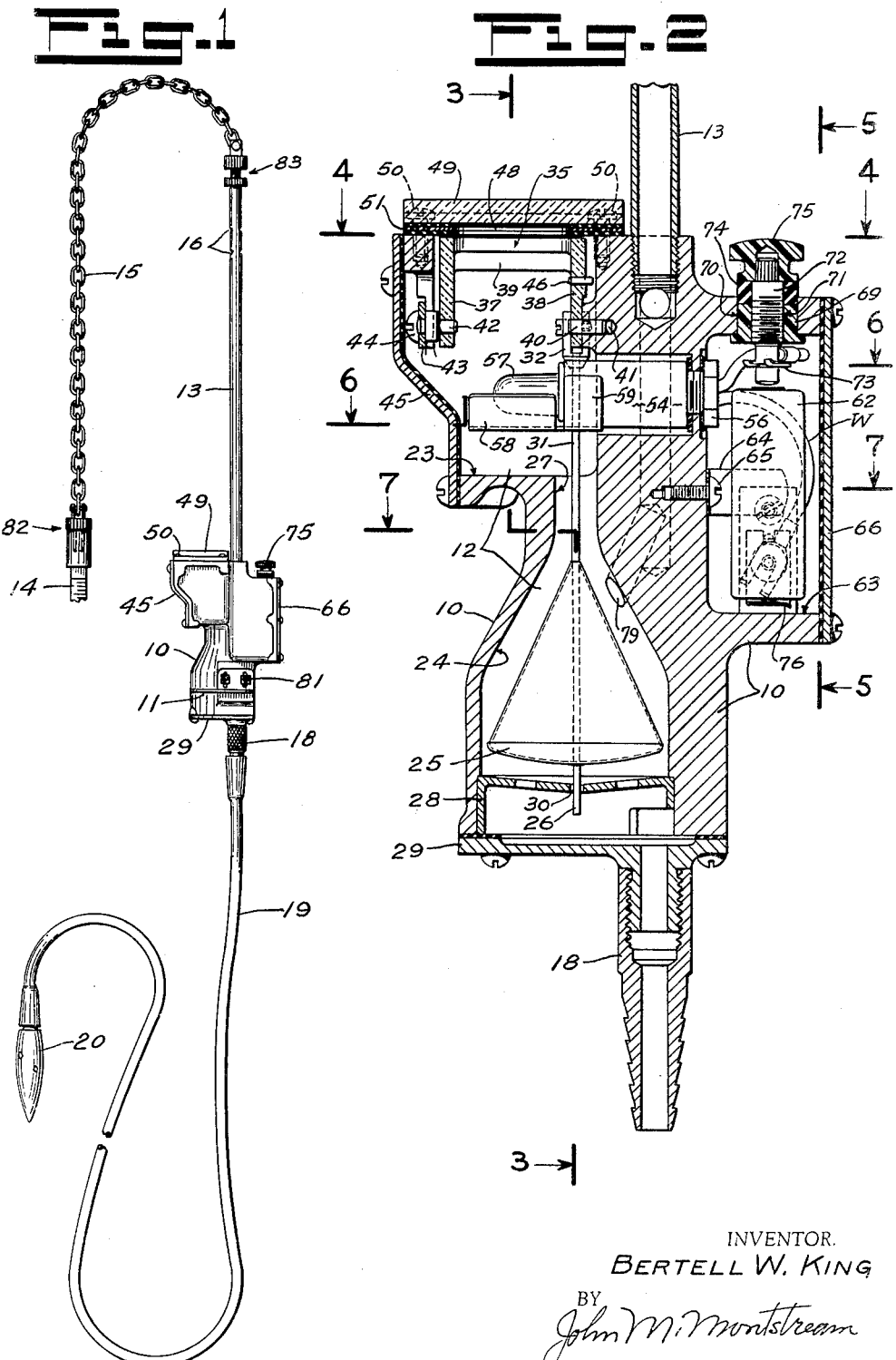

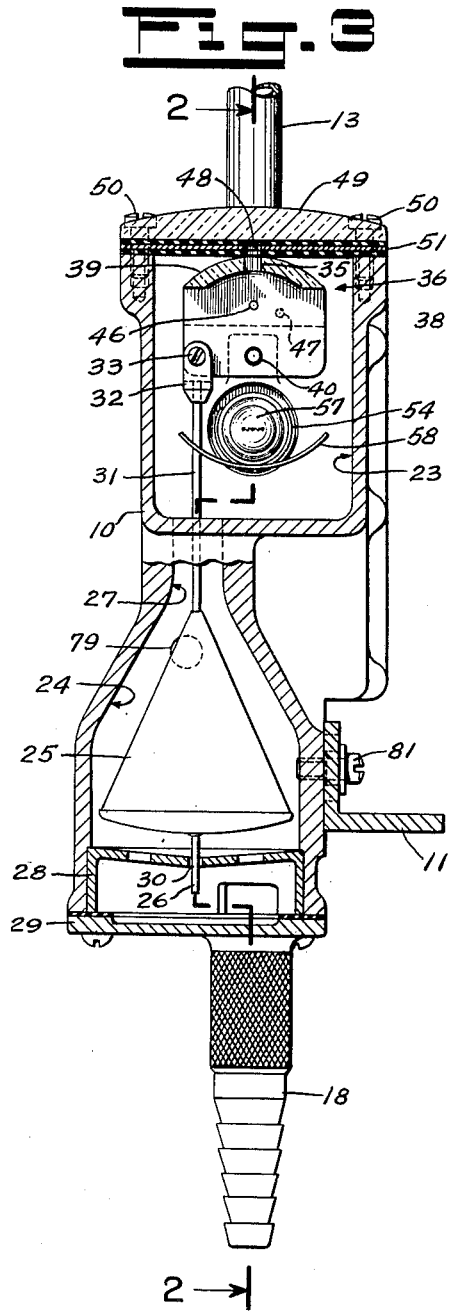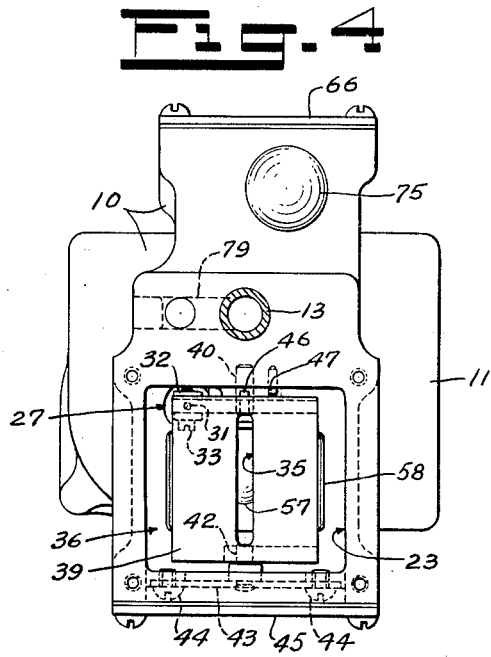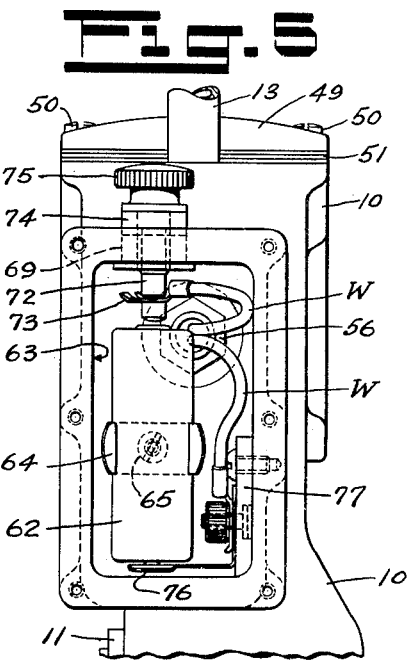

INVENTOR.
BERTELL W. KING
BY
John M. Montstream
ATTORNEY

United States Patent Office 3,210,999
Patented Oct. 12, 1965

3,210,999
PORTABLE INSTRUMENT FOR MEASURING AN ELEVATION ABOVE WATER LEVEL
Bertell W. King, 17 Battery Place, New York, N.Y.
Filed Feb. 6, 1964, Ser. No. 342,878
7 Claims. (Cl. 73—290)

The invention relates to an instrument for determining an elevation above mean water level such as the deck of the barge or scow. In calculating the amount of material on or removed from a barge the elevation of the deck of the barge above mean water level is measured at least at four points around the deck of the barge and usually at a larger number of points particularly on on a large barge. Knowing the displacement of the barge when unloaded and calculating the displacement when loaded, the difference is the weight of the material on the barge. The loaded displacement can be determined by taking measurements of the elevation of the deck above water level around the barge. Also by taking measurements before and after unloading the barge, the amount of material removed can be readily calculated. This is useful for example with a barge loaded with sand and delivery is made to two or more customers. The instrument to be described is an improvement on that of my Patent 2,265,647.

The accuracy of the above calculations is dependent upon the accuracy of the measurements of the elevation of the deck of the barge above water level. In instruments heretofore used, the user lowered the instrument from the deck and by watching a pointer on the instrument as the instrument is moved up or down until the pointer is at zero on a scale thereby determining that the instrument was properly located at mean water level. A reading is taken of the elevation of the deck above water level. Accurately positioning the instrument at mean water level by observing a pointer several feet below at water level is not easy under many conditions. The instrument herein improves the visibility and accuracy of determining when the instrument is at mean water level by using a beam of light. Preferably when the instrument is above or below water level the light shown has a color red and only when the light is all white without a trace of red, or other color, it is known that the instrument is precisely at water level, whereupon a measurement of the elevation of the deck above water line is taken.

It is an object of the invention to construct an instrument for measuring an elevation, such as the elevation of the deck of a barge, above water level by using a beam of light as the indicator.

Another object as is above and in addition when the instrument is above or below water level at least part of the light is colored such as red.

Other objects of the invention will be more apparent from the following description when taken in connection with the accompanying drawings illustrating a preferred embodiment thereof in which:

FIG. 1 is a side elevation of the complete instrument in reduced size;

FIG. 2 is a vertical section through the instrument taken on line 2—2 of FIG. 3;

FIG. 3 is a vertical section taken on line 3—3 of FIG. 2;

FIG. 4 is a top view of the instrument taken on line 4—4 of FIG. 2 looking at a shutter;

FIG. 5 is a view into the battery chamber taken on line 5—5 of FIG. 2;

Figure 6:
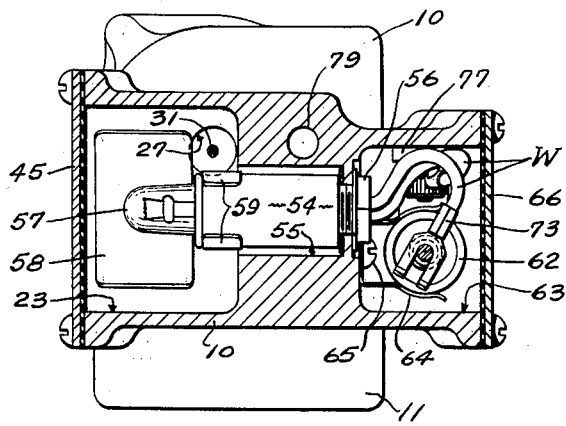
FIG. 6 is a cross-section taken on line 6—6 of FIG. 2.
Figure 7:
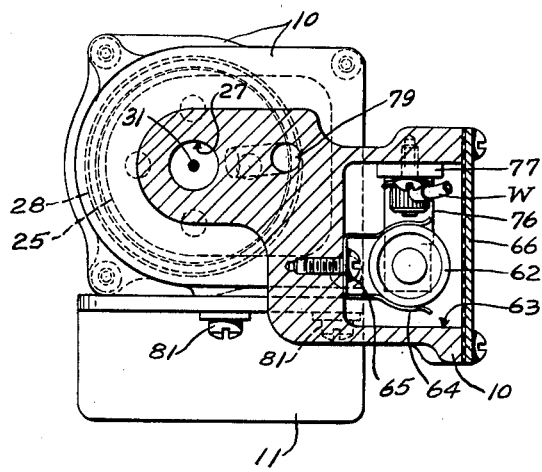
FIG. 7 is a cross-section between chamber portions taken on line 7—7 of FIG. 2.

The various general elements of a complete instrument comprises a casing 10 including a reference point or level, such as the upper surface of a flange 11, which is at the mean water level when the instrument is at zero level or reading, a chamber 12 in the casing, and a vent pipe 13 projecting vertically from the casing. A measuring means such as a tape 14 is suitably attached to the casing. The tape is shown connected with the housing by being connected to the vent pipe through a chain 15 attached to one end of the pipe and the tape being attached to the other end of the chain. The vent pipe 13 has vent holes 16 through the wall thereof well above any waves.

The elevation from the instrument, or particularly from the flange, to the deck of the barge is conveniently determined by taking a reading from a standard, such as shown in FIGS. 11 and 14 of my Patent 3,066,531 which standard rests on the deck. This standard has a fixed height, such as three feet, so that a reading taken on the tape at the top of the standard would require a subtraction of the height of the standard from the reading to give the deck elevation. If, however, the measurement from the reference flange 11 to the end of the chain is three feet, then a direct reading of elevation can be taken at the top of the three foot standard from a tape attached at the upper end of the chain. The instrument also includes an inlet connection 18 to the chamber on the bottom of the casing with a flexible hose 19 attached thereto with a suitable nozzle 20 on the end thereof constructed as described in the above patent.

The water level in the chamber of the casing is the mean water level because the hose reaches down below wave action so that the water level in the casing is unaffected thereby. The nozzle assures that currents at the nozzle will not affect the water level in the casing and not affect the position of a float within the casing. It is desirable that the dimension between the top surface of the flange or reference point and the upper end of the chain be a fixed dimension, such as three feet, so that the first three feet of the tape may be cut off whereby a direct reading may be secured at the deck. If this dimension is three feet and a standard is used having a height of three feet, a direct reading is secured with an unshortened tape when the reading is taken from the top of the standard.

The chamber of the casing has an upper portion or shutter chamber 23 and a lower portion or float chamber 24 in which float means is suitably mounted. A single float 25 is shown. The bottom of the float may carry a guide pin 26 which is received in a hole 30 in an inverted cup 28 received in the bottom of the float chamber. The cup has holes for passage of water. The bottom of the casing is sealed with a suitable gasketed plate 29, which plate carries the connection or nipple 18 for receiving the end of the hose. The upper surface of the float is sharply tapered so that water will not remain thereon to affect the position of the float. The upper end of the float has a stem 31, which conveniently is a continuation of the guide pin 26, and the upper end of the stem is connected through a fork 32 and a pivot 33 to an indicator or shutter.

The shutter is movably mounted in the upper portion 23 of the chamber and is moved by the float 25 as the water level in the casing changes upon raising and lowering the instrument to position it at mean water level. The shutter 36 particularly shown is pivotally mounted. This shutter comprises a pair of spaced side plates 37 and 38 secured together by a connector having an arcuate upper surface. This connector has a transparency, preferably clear, which is conveniently a small opening and preferably a slot 36 through the connector. The shutter is pivotally mounted in the upper or shutter portion 23 of the chamber in the casing on suitable pivot means. The pivot means shown is a pin 40 secured in a hole 41 in the casing and received in a hole in the inner side plate 38. The outer side plate 37 has a hole which receives a pivot pin 42 which is carried by a cross bracket 43 which extends across the shutter portion of the chamber and is secured to the casing by screws 44. A side plate 45 closes the open side of the shutter portion 23 of the chamber or casing so that access to the shutter is provided for mounting and repair or replacement of parts.

Preferably the connector 39 or its arcuate surface is a colored transparency, such as red, at least adjacent to the clear transparency or slot 36 so that red light is shown other than at the clear transparency. It is evident the shutter transparencies may be different colors or the slot transparencies may be colored and the rest be clear. The entire shutter is shown as an integral element and hence may be all colored plastic. Suitable stop means may be provided on the shutter shown as a stop pin 46 carried by the shutter which engages a stop pin 47 carried by the casing, FIG. 3.

A clear transparency is provided at the top of tht shutter portion of the chamber and conveniently is a small opening and preferably a slot 48 comparable to, or the same width as, that of the transparency 35 of the shutter. It may be constructed by providing a cover means including a top plate which is transparent. Between the top plate and the casing is a masking member or panel 51 having a transparency such as the slot therein. This slot desirably will coincide in width with that of the transparency or slot 35 in the shutter. A slot about one eighth of an inch wide should be suitable.

Light means is provided in the shutter portion of the chamber and immediately below the shutter in alignment with the slot in the shutter. The light means includes a socket 54, FIG. 6, secured in a socket hole 55 in the casing by a nut 56. A lamp 57 is adapted to be received in the socket and located below the shutter. Preferably a reflector 58 is provided underneath the lamp of the light means to concentrate the light from the lamp upwardly towards the slot in the shutter. This reflector is retained in place by flexible fingers 59 which are received around the socket.

Battery support means is provided adapted to receive a battery 62 to light the lamp and a mercury battery is particularly suited because of its long life and small dimensions. The battery is supported in a battery chamber 63 by a clip 64 secured in the chamber by a screw 65 and the chamber is closed by a plate 66. A suitable light switch is provided in an electrical circuit between the battery and the lamp socket which switch must be waterproof. The switch shown, FIG. 2, includes an insulating washer 69 which is received in a hole 70 in the top of the casing to the battery chamber 63 and having a threaded hole 71. A conducting switch screw 72 is threaded into the threaded hole in the insulating washer and it carries a slot receiving a connecting fork 73, FIG. 6, to which a wire W from the light socket is electrically connected. A compressible washer 74 is provided between the insulated washer and a knob 75 which is secured to the threaded switch screw. In order to close the switch the knob is turned to thread the contactor screw downwardly into contact with the terminal of the battery 62 and in doing this the compressible washer expands to provide a water tight closure for the opening 71 into the battery chamber. The circuit is completed by another wire W from the lamp socket which wire is attached to a contact 76 secured in the battery chamber on an insulating pad 77. This contact is adapted to engage the bottom or other terminal of the battery.

A vent connection 79 is provided between the vent pipe 13 and the chamber above the float 25. By making the connection with the chamber about at the top of the float the upper portion of the chamber has air trapped therein so that water cannot reach the upper chamber and the lamp and shutter therein should an instrument man accidentally lower the casing well below water level.

The flange 11 or reference point is adjustable on the casing by screws 81 so that the reference surface is just at water level when the shutter transparency 35 is in alignment with the casing transparency 48. This flange surface is then used to precisely measure the distance to the upper end 82 of the chain 15. If the chain should change length in use, it sometimes is lengthened, the chain can be raised or lowered with respect to the reference surface at 83 between chain and vent pipe, so that the distance between the flange and the end 82 of the chain 15 is precisely the right measurement.

In setting the instrument, the casing is immersed in water with the surface of the water, even or level with the top surface of the flange. If the transparencies are not aligned, the flange is then adjusted so that the slot in the shutter is in exact alignment with the slot in the masking plate with the water level at the top surface of the flange. This fixes the top surface of the flange as a reference point for measuring the proper location for the end of the chain. The instrument is then ready for use.

In using the instrument, it is lowered over the side of the barge or scow to about water level. The tape is lowered or raised and hence also the instrument until full white light appears in the slot if clear transparencies alone are provided. If a red colored top surface transparency or red connector 39 for the shutter is used, red shows in the slot in the masking plate or top of the instrument whenever the casing is above or below exact mean water level position. Some red will appear in the slot in the masking plate whenever the casing is approximately but not exactly at water level position. When, however, the casing is lowered or raised so that nothing but white light shows in the slot, it is known that the casing is at mean water level or proper elevation for taking a reading. A series of such readings are taken around the deck of the barge and from these readings the displacement of the barge can be calculated whether fully loaded, partially loaded or unloaded.

The float means may be the compensating float means of FIG. 5 of Patent 3,066,531 using two floats as described therein connected with the indicator or shutter 36. The vent pipe 13 when serving as the attachment for the tape 14 is in line with the inlet nipple 18.

This invention is presented to fill a need for improvements in an instrument for measuring an elevation above mean water level. It is understood that various modifications in structure, as well as changes in mode of operation, assembly, and manner of use, may and often do occur to those skilled in the art, especially after benefiting from the teachings of an invention. This disclosure illustrates the preferred means embodying the invention in useful form.

What is claimed is:

1. A portable instrument for measuring an elevation above water level comprising a casing including a chamber and a reference point and a vent pipe extending upwardly, a shutter having a small transparency, means mounting the shutter on the casing for movement within the chamber, float means mounted in the chamber and connected with the shutter to move the same, a top for the casing adjacent to the shutter and having a small transparency in alignment with the transparency in the shutter when the latter is in measuring position, an inlet into the chamber at the bottom of the casing, a vent connected with the chamber above the float means and with the vent pipe, a lamp socket carried by the casing to receive a lamp located below the shutter transparency to project light through the transparencies, a battery chamber carried by the casing, electrical connections from the battery chamber to the light socket, and a measuring means attached to the casing.

2. A portable instrument as in claim 1 in which the shutter mounting means is pivot means mounting the shutter for pivotal movement, the shutter having an arcuate surface positioned adjacent to the transparency in the top of the casing, and the transparency of the shutter being in the arcuate surface.

3. A portable instrument as in claim 1 in which the casing chamber has an upper portion in which the shutter and lamp socket is mounted and a lower portion in which the float is mounted, and the vent being connected with the chamber adjacent to the upper part of the lower portion of the chamber.

4. A portable instrument as in claim 2 in which the shutter transparency is a slot, the arcuate surface being a colored transparency.

5. A portable instrument as in claim 2 in which the top of the casing is a transparent cover secured to the casing, and a masking panel within the casing adjacent to the cover and carrying the casing transparency.

6. A portable instrument as in claim 5 in which the transparency in the masking panel is a slot.

7. A portable instrument as in claim 1 in which the reference point is a flange on the exterior of the casing, and flange mounting means adjustably mounting the flange.

No references cited.

ISAAC LISANN, *Primary Examiner.*